United States Patent
Park et al.

(10) Patent No.: US 11,932,794 B2
(45) Date of Patent: Mar. 19, 2024

(54) QUANTUM-DOT BASED ON GRADED-SHELL STRUCTURE AND MANUFACTURING METHOD OF THE SAME

(71) Applicant: INDUSTRY-UNIVERSITY COOPERATION FOUNDATION HANYANG UNIVERSITY, Seoul (KR)

(72) Inventors: Jea Gun Park, Jeonju-si (KR); Seung Jae Lee, Seoul (KR); Ji Eun Lee, Seoul (KR); Chang Jin Lee, Seoul (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 785 days.

(21) Appl. No.: 17/040,879

(22) PCT Filed: May 22, 2020

(86) PCT No.: PCT/KR2020/006683
§ 371 (c)(1),
(2) Date: Sep. 23, 2020

(87) PCT Pub. No.: WO2021/215576
PCT Pub. Date: Oct. 28, 2021

(65) Prior Publication Data
US 2023/0106112 A1 Apr. 6, 2023

(30) Foreign Application Priority Data
Apr. 24, 2020 (KR) ........................ 10-2020-0049814

(51) Int. Cl.
C09K 11/88 (2006.01)
B82Y 20/00 (2011.01)
C09K 11/02 (2006.01)

(52) U.S. Cl.
CPC ............ *C09K 11/881* (2013.01); *B82Y 20/00* (2013.01); *C09K 11/02* (2013.01); *C09K 11/88* (2013.01); *C09K 11/883* (2013.01)

(58) Field of Classification Search
CPC ..... C09K 11/881; C09K 11/883; C09K 11/02; C09K 11/88
See application file for complete search history.

(56) References Cited

FOREIGN PATENT DOCUMENTS

CN 110028963 A 7/2019
CN 110088227 A 8/2019
(Continued)

OTHER PUBLICATIONS

Jung-Ho Jo et al., "InP-Based Quantum Dots Having an InP Core, Composition-Gradient ZnSeS Inner Shell, and ZnS Outer Shell with Sharp, Bright Emissivity, and Blue Absorptivity for Display Devices", ACS Appl. Nano Mater. 2020, 3, Jan. 28, 2020, P1972-P1980.

*Primary Examiner* — C Melissa Koslow
(74) *Attorney, Agent, or Firm* — NKL LAW; Jae Youn Kim

(57) ABSTRACT

Disclosed are quantum dots based on a graded multishell structure and a method of manufacturing the same. More particularly, each of the quantum dots according to an embodiment of the present invention includes a core, inter shells surrounding the core, and an outer shell surrounding the inter shells, wherein the concentrations of compounds composing the inter shells are changed stepwise from the core to the outer shell.

13 Claims, 15 Drawing Sheets

(56) References Cited

FOREIGN PATENT DOCUMENTS

| | | |
|---|---|---|
| JP | 2019519455 A | 7/2019 |
| KR | 10-2008-0107578 A | 12/2008 |
| KR | 10-1060231 B1 | 8/2011 |
| KR | 10-1525524 B1 | 6/2015 |
| KR | 10-1537296 B1 | 7/2015 |
| KR | 10-2015-0111307 A | 10/2015 |
| KR | 10-1563878 B | 10/2015 |
| KR | 20150111370 A | 10/2015 |
| KR | 10-1774775 B1 | 9/2017 |
| KR | 10-2019-0085884 A | 7/2019 |
| KR | 10-2019-0106823 A | 9/2019 |
| KR | 10-1984990 B1 | 9/2019 |
| KR | 10-2019-0136881 A | 12/2019 |
| KR | 10-2020-0016057 A | 2/2020 |
| KR | 10-2020-0034398 A | 3/2020 |
| TW | 201917195 A | 5/2019 |
| WO | 2019084135 A1 | 5/2019 |
| WO | WO 2019/084135  * | 5/2019 |
| WO | 2019131402 A1 | 11/2020 |

* cited by examiner

QUANTUM-DOT BASED ON GRADED-SHELL STRUCTURE AND MANUFACTURING METHOD OF THE SAME

CROSS-REFERENCE TO RELATED APPLICATION

This application is a National Stage Entry of PCT International Application No. PCT/KR2020/006683, which was filed on May 22, 2020, and which claims priority to Korean Patent Application No. 10-2020-0049814, filed on Apr. 24, 2020 in the Korean Intellectual Property Office, the disclosure of which is incorporated herein by reference.

TECHNICAL FIELD

The present invention relates to quantum dots and a method of manufacturing the same, and more particularly to quantum dots based on a graded multishell structure and a method of manufacturing the same.

BACKGROUND ART

Quantum dots, which are colloidal semiconductor crystals, have sizes of several nanometers to tens of nanometers, and have advantages such as high color purity, color reproducibility, and light stability.

In particular, semiconductor crystals composed of quantum dots can be controlled to emit a wide range of light emission wavelengths by adjusting particle sizes thereof and can be easily fabricated through a solution process. Accordingly, quantum dots have attracted attention as a next-generation light-emitting material.

For example, each quantum dot may include a core and shells surrounding the core. Here, the core may be formed based on an indium phosphide (InP) compound, and the shells may be formed based on a ZnS compound.

However, in the case of the InP/ZnS-based quantum dots, lattice mismatch may occur due to a lattice constant difference between the InP core and the ZnS shells, which may cause wide half-width characteristics and non-uniform shell epitaxial growth characteristics.

DISCLOSURE

Technical Problem

Therefore, the present invention has been made in view of the above problems, and it is one object of the present invention to provide quantum dots including graded structure-based inter shells that are formed between a core and an outer shell to minimize lattice mismatch and maximize quantum confinement, and a method of manufacturing the quantum dots.

It is another object of the present invention to provide quantum dots including inter shells that are formed through a graded heating-up growth process to minimize thermal expansion coefficient (TEC) mismatch and, accordingly, improve optical characteristics, and a method of manufacturing the quantum dots.

Technical Solution

In accordance with an aspect of the present invention, the above and other objects can be accomplished by the provision of a quantum dot, including a core; inter shells surrounding the core; and an outer shell surrounding the inter shells, wherein concentrations of compounds composing the inter shells are changed stepwise from the core to the outer shell.

Composition ratios of compounds composing the inter shells may be changed stepwise from the core to the outer shell.

The inter shells may include a first inter shell having a multilayer structure and a second inter shell having a multilayer structure.

A concentration of a group II element of the first inter shell may increase and a concentration of a first group VI element of the first inter shell may be decreased, from the core to the outer shell, and a concentration of a first group VI element of the second inter shell may be decreased and a concentration of the second group VI element of the second inter shell may increase, from the core to the outer shell.1

The first inter shell may include a $Zn_aSe_b/Zn_cSe_d/Zn_eSe_f$ multilayer, where a is 0.3 to 0.6, b is 0.2 to 0.3, c is 0.36 to 0.72, d is 0.16 to 0.24, e is 0.39 to 0.78, f is 0.14 to 0.21, and a to f satisfy a<c<e and b>d>f.

The second inter shell may include a $Zn_gSe_hS_i/Zn_jSe_kS_l$ multilayer, where g is 0.1 to 0.5, h is 0.005 to 0.020, i is 0.5 to 2.0, j is 0.1 to 0.5, k is 0.0025 to 0.010, l is 1.0 to 4.0, and g to l satisfy g≤j, h>k and i<l.

The inter shells may include at least one of group compounds, group VI compounds and combinations thereof.

The core may include at least one of group III-V compounds, group II-VI compounds, group compounds, group III-III-II-VI compounds and combinations thereof, and the outer shell may include group II-VI compounds.

In accordance with another aspect of the present invention, there is provided a method of manufacturing quantum dots, the method including: forming a core; forming inter shells surrounding the core, and forming an outer shell surrounding the inter shells, wherein a concentration of compounds composing the inter shells is changed stepwise from the core to the outer shell.

The forming of the inter shells may further include: forming a first inter shell surrounding the core while increasing a growth temperature stepwise in a temperature range of 120° C. to 330° C.; and forming a second inter shell surrounding the first inter shell while increasing a growth temperature stepwise in a temperature range of 260° C. to 320° C.

The forming of the first inter shell may further include: forming a first shell layer surrounding the core while increasing a growth temperature stepwise in a temperature range of 120° C. to 210° C.; forming a second shell layer surrounding the first shell layer while increasing a growth temperature stepwise in a temperature range of 240° C. to 270° C., and forming a third shell layer surrounding the second shell layer while increasing a growth temperature stepwise in a temperature range of 300° C. to 330° C.

The first shell layer may include a $Zn_aSe_b$ compound, the second shell layer may include a $Zn_cSe_d$ compound, and the third shell layer may include a $Zn_eSe_f$ compound, where a is 0.3 to 0.6, b is 0.2 to 0.3, c is 0.36 to 0.72, d is 0.16 to 0.24, e is 0.39 to 0.78, f is 0.14 to 0.21, and a to f satisfy a<c<e and b>d>f.

The forming of the second inter shell may further include: forming a fourth shell layer surrounding the first inter shell while increasing a growth temperature stepwise in a temperature range of 260° C. to 300° C., and forming a fifth shell layer surrounding the fourth shell layer at a growth temperature of 320° C.

The fourth shell layer may include a $Zn_gSe_hS_i$ compound, and the fifth shell layer may include a $Zn_jSe_kS_l$ compound, where g is 0.1 to 0.5, h is 0.005 to 0.020, i is 0.5 to 2.0, j is 0.1 to 0.5, k is 0.0025 to 0.010, l is 1.0 to 4.0, and g to 1 satisfy $g \leq j$, $h > k$ and $i < l$.

Advantageous Effects

According to an embodiment of the present invention, graded structure-based inter shells can be formed between a core and an outer shell, thereby being capable of minimizing lattice mismatch and maximizing quantum confinement.

According to an embodiment of the present invention, the inter shells can be formed through a graded heating-up growth process, thereby being capable of minimizing thermal expansion coefficient (TEC) mismatch and, accordingly, improving optical characteristics.

BEST MODE

Figure 1:
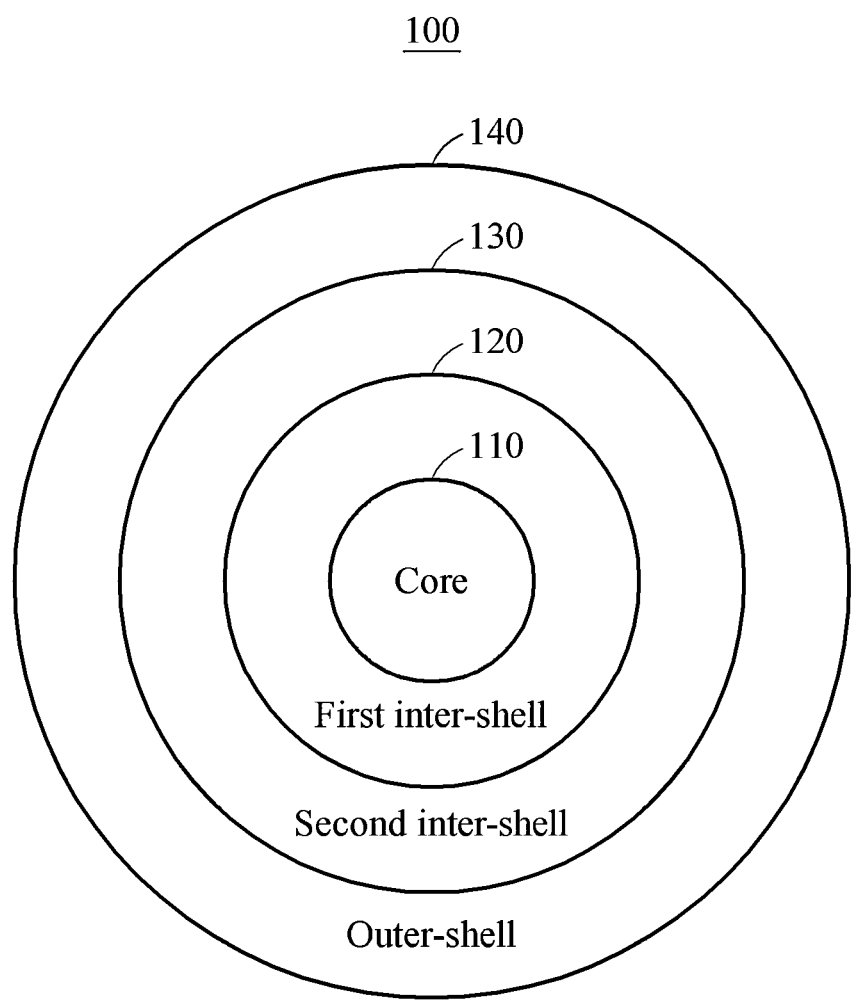
FIG. 1 illustrates a quantum dot according to an embodiment of the present invention.

The embodiments will be described in detail herein with reference to the drawings.

However, it should be understood that the present disclosure is not limited to the embodiments according to the concept of the present disclosure, but includes changes, equivalents, or alternatives falling within the spirit and scope of the present disclosure.

In the following description of the present disclosure, a detailed description of known functions and configurations incorporated herein will be omitted when it may make the subject matter of the present disclosure unclear.

The terms used in the specification are defined in consideration of functions used in the present disclosure, and can be changed according to the intent or conventionally used methods of clients, operators, and users. Accordingly, definitions of the terms should be understood on the basis of the entire description of the present specification.

In description of the drawings, like reference numerals may be used for similar elements.

The singular expressions in the present specification may encompass plural expressions unless clearly specified otherwise in context.

In this specification, expressions such as "A or B" and "at least one of A and/or B" may include all possible combinations of the items listed together.

Expressions such as "first" and "second" may be used to qualify the elements irrespective of order or importance, and are used to distinguish one element from another and do not limit the elements.

It will be understood that when an element (e.g., first) is referred to as being "connected to" or "coupled to" another element (e.g., second), it may be directly connected or coupled to the other element or an intervening element (e.g., third) may be present.

As used herein, "configured to" may be used interchangeably with, for example, "suitable for", "ability to", "changed to", "made to", "capable of", or "designed to" in terms of hardware or software.

In some situations, the expression "device configured to" may mean that the device "may do ~" with other devices or components.

For example, in the sentence "processor configured to perform A, B, and C", the processor may refer to a general purpose processor (e.g., CPU or application processor) capable of performing corresponding operation by running a dedicated processor (e.g., embedded processor) for performing the corresponding operation, or one or more software programs stored in a memory device.

In addition, the expression "or" means "inclusive or" rather than "exclusive or".

That is, unless otherwise mentioned or clearly inferred from context, the expression "x uses a or b" means any one of natural inclusive permutations.

In the above-described specific embodiments, elements included in the invention are expressed singular or plural in accordance with the specific embodiments shown.

It should be understood, however, that the singular or plural representations are to be chosen as appropriate to the situation presented for the purpose of description and that the above-described embodiments are not limited to the singular or plural constituent elements. The constituent elements expressed in plural may be composed of a single number, and constituent elements expressed in singular form may be composed of a plurality of elements.

In addition, the present invention has been described with reference to exemplary embodiments, but it should be understood that various modifications may be made without departing from the scope of the present disclosure.

Therefore, the scope of the present invention should not be limited by the embodiments, but should be determined by the following claims and equivalents to the following claims.

FIG. 1 illustrates a quantum dot according to an embodiment of the present invention.

Referring to FIG. 1, a quantum dot 100 according to an embodiment of the present invention includes a core, an outer shell, and graded structure-based inter shells formed between the core and the outer shell, thereby being capable of minimizing lattice mismatch and maximizing quantum confinement.

In addition, the inter shells of the quantum dot 100 may be formed through a graded heating-up growth process, thereby being capable of minimizing thermal expansion coefficient (TEC) mismatch and, accordingly, improving optical characteristics.

For example, the quantum dot 100 may be a red-emitting quantum dot or a green-emitting quantum dot.

Groups described below refer to groups on the periodic table.

In addition, 'group I' may include group IA and group IB, and 'group I' elements may include, for example, Li, Na, K, Ru, and Cs, but the present invention is not limited thereto.

'Group II' may include group IIA and group IIB, and group II elements may include, for example, Cd, Zn, Hg and Mg, but the present invention is not limited thereto.

'Group III' may include group IIIA and group IIIB, and group III elements may include, for example, Al, In, Ga, and Tl, but the present invention is not limited thereto.

'Group IV' may include group IVA and IVB, and group IV elements may include, for example, Si, Ge and Sn, but the present invention is not limited thereto.

'Group V' may include group VA, and group V elements may include, for example, N, P, As, Sb and Bi, but the present invention is not limited thereto.

'Group VI' may include group VIA, and group VI elements may include, for example, S, Se and Te, but the present invention is not limited thereto.

In particular, the quantum dot 100 may include a core 110; inter shells 120 and 130 surrounding the core 110; and an outer shell 140 surrounding the inter shells 120 and 130. Here, the concentrations of compounds composing the inter shells 120 and 130 may be gradually changed from the core 110 to the outer shell 140. That is, the inter shells 120 and 130 may be formed to have a graded structure.

The core 110 may include at least one of group III-V compounds, group II-VI compounds, group compounds, group III-III-II-VI compounds and combinations thereof, and the outer shell 140 may include group II-VI compounds.

For example, the group III-V compounds may include at least one of binary compounds selected from GaN, GaP, GaAs, GaSb, AlN, AlP, AlAs, AlSb, InN, InP, InAs, InSb and combinations thereof, ternary compounds selected from GaNP, GaNAs, GaNSb, GaPAs, GaPSb, AlNP, AlNAs, AlNSb, AlPAs, AlPSb, InGaP, InNP, InNAs, InNSb, InPAs, InPSb and combinations thereof, and quaternary compounds selected from GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb and combinations thereof.

In addition, the group II-VI compounds may include at least one of binary compounds selected from CdSe, CdTe, ZnO, ZnS, ZnSe, ZnTe, HgS, HgSe, HgTe, MgSe, MgS and combinations thereof, ternary compounds selected from CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, HgZnTe, MgZnSe, MgZnS and combinations thereof, and quaternary compounds selected from HgZnTeS, CdZnSeS, CdZnSeTe, CdZnSTe, CdHgSeS, CdHgSeTe, CdHgSTe, HgZnSeS, HgZnSeTe, HgZnSTe and combinations thereof.

More particularly, the core 110 may include at least one of an InP compound, an InGaP compound, an InAlP compound, an InBP compound and a GaP compound.

Preferably, the core 110 may include an InP compound, and the outer shell 140 may include a ZnS compound.

Meanwhile, the core 110 may be formed in a multilayer form including an inter core and an outer core.

For example, the outer core may be implemented to have the same band gap and structure as the inter core and to have a relatively thin thickness compared to the inter core.

More particularly, when the quantum dot 100 is a red-emitting quantum dot and a core size corresponding to a desired red wavelength (620 nm to 630 nm) energy band-gap is formed with a single core, a very wide core size distribution (FWHM increase) may occur due to Ostwald ripening.

On the other hand, the core 110 of the present invention may be formed (adjusted) to have a core size corresponding to a desired red wavelength (620 nm to 630 nm) energy band-gap, while maintaining a uniform size distribution, by suppressing Ostwald ripening through a multilayer core process.

For example, the inter core may include an $In_mP_n$ compound, and the outer core may include an $In_oP_p$ compound, where m is 0.30 to 0.04, n is 0.25 to 0.35, o is 0.15 to 0.20, p is 0.125 to 0.175, and m to p satisfy m>o and n>p.

The inter shells 120 and 130 may include at least one of group II-III-VI compounds, group III-III-II-VI compounds and combinations thereof.

In addition, the inter shells 120 and 130 may include a first inter shell 120 having a multilayer structure and a second inter shell 130 having a multilayer structure.

For example, the inter shells 120 and 130 may include at least one of a ZnSe compound, a ZnSeS compound, a ZnTe compound, a ZnTeSe compound, a ZnTeSeS compound and a ZnTeS compound. Preferably, the first inter shell 120 may include a ZnSe compound, and the second inter shell 130 may include a ZnSeS compound.

Composition ratios of compounds composing the inter shells 120 and 130 may be changed stepwise from the core 110 to the outer shell 140.

That is, composition ratios of the first inter shell 120 and the second inter shell 130 may be designed to minimize lattice mismatch of the outer shell. Accordingly, uniform epitaxial growth may be realized by minimizing lattice mismatch, whereby improvement in optical characteristics (quantum yield increase and half-width reduction) may be anticipated.

In particular, in the case of the first inter shell 120, the concentration of a group II element may increase and the concentration of a first group VI element may be decreased from the core 110 to the outer shell 140. In addition, in the case of the second inter shell 130, the concentration of a first group VI element may be decreased and the concentration of a second group VI element may increase from the core 110 to the outer shell 140.

Preferably, with regard to the first and second inter shells 120 and 130, the group II element may be a Zn element, the first group VI element may be a Se element, and the second group VI element may be an S element.

Figure 2:
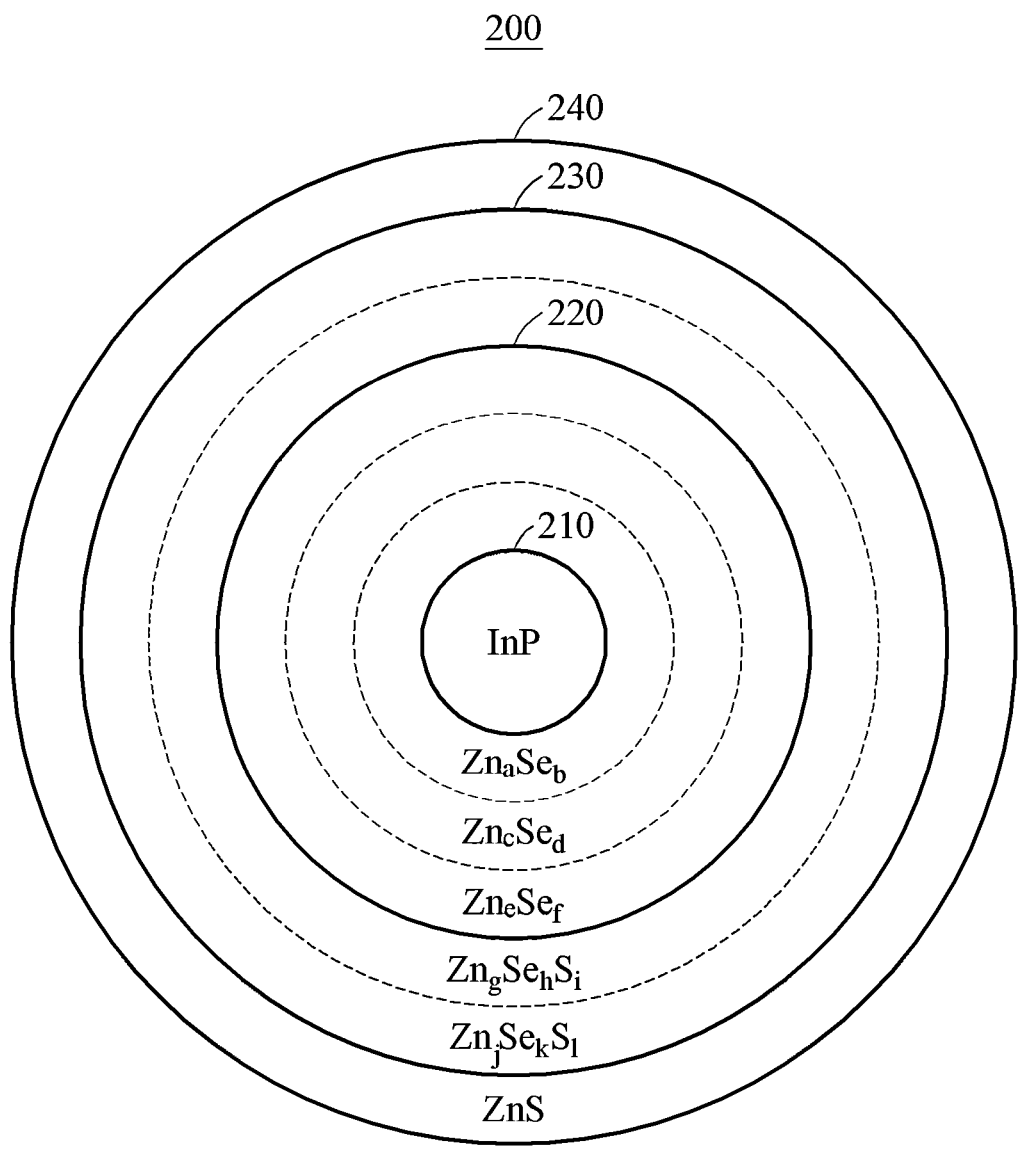
FIG. 2 illustrates an embodiment of a quantum dot according to an embodiment of the present invention.

FIG. 2 illustrates an embodiment of a quantum dot according to an embodiment of the present invention.

In other words, FIG. 2 illustrates an embodiment of the quantum dot according to an embodiment of the present invention described with reference to FIG. 1. Hereinafter, parts, which overlap with the contents described in FIG. 1, of contents described with reference to FIG. 2 are omitted.

Referring to FIG. 2, the quantum dot according to an embodiment of the present invention may include an InP core 210, a first inter shell 220 surrounding the InP core 210, the second inter shell surrounding the first inter shells 220, and a ZnS outer-shell 240 surrounding the second inter shell.

In addition, the concentrations of compounds composing the first inter shell 220 and the second inter shell 230 may be changed stepwise from the InP core 210 to the ZnS outer-shell 240, and each of the first inter shell 220 and the second inter shell 230 may be realized to have a multilayer structure.

In particular, the first inter shell 220 may include a $Zn_aSe_b/Zn_cSe_d/Zn_eSe_f$ multilayer, where a is 0.3 to 0.6, b is 0.2 to 0.3, c is 0.36 to 0.72, d is 0.16 to 0.24, e is 0.39 to 0.78, f is 0.14 to 0.21, and a to f satisfy a<c<e and b>d>f.

That is, the first inter shell 220 may include a $Zn_aSe_b$ compound-based first shell layer surrounding the core 210, a $Zn_eSe_d$ compound-based second shell layer surrounding the first shell layer, and a $Zn_eSe_f$ compound-based second shell layer surrounding the second shell layer.

In addition, the second inter shell 230 may include a $Zn_gSe_hS_i/Zn_jSe_kS_l$ multilayer, where g is 0.1 to 0.5, h is 0.005 to 0.020, i is 0.5 to 2.0, j is 0.1 to 0.5, k is 0.0025 to 0.010, l is 1.0 to 4.0, and g to l satisfy g≤j, h>k and i<l.

For example, g=j when the quantum dot according to an embodiment of the present invention is a red-emitting quantum dot, and g<j when the quantum dot according to an embodiment of the present invention is a red-emitting quantum dot.

Figure 3:
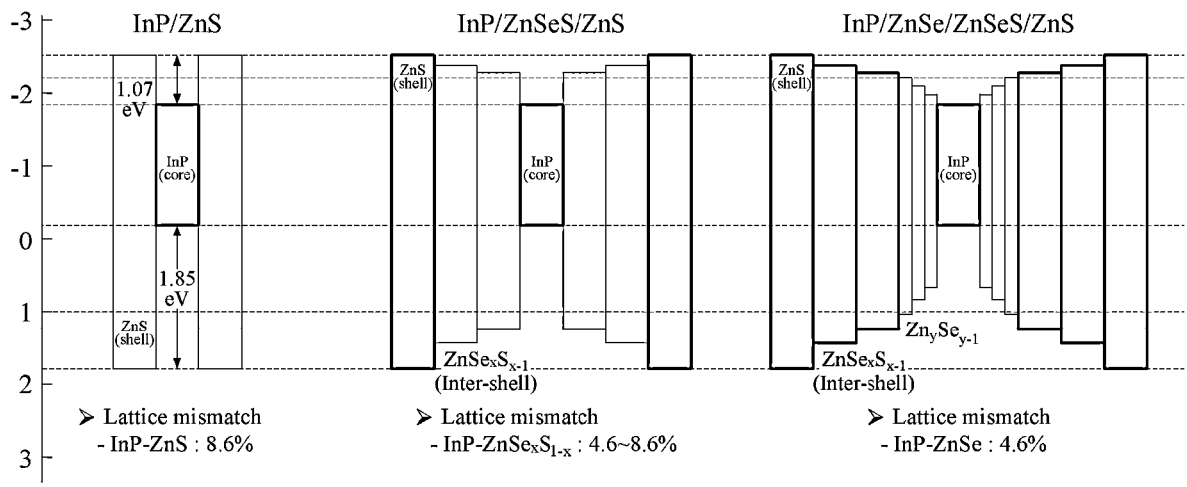
FIG. 3 illustrates energy band-gap diagrams of quantum dots according to an embodiment of the present invention.

FIG. 3 illustrates energy band-gap diagrams of quantum dots according to an embodiment of the present invention.

Referring to FIG. 3, FIG. 3(a) illustrates an energy band-gap diagram of InP/ZnS structure-based quantum dots, FIG. 3(b) illustrates an energy band-gap diagram of InP/ZnSeS/ZnS structure-based quantum dots, and FIG. 3(c) illustrates an energy band-gap diagram of InP/ZnSe/ZnSeS/ZnS structure-based quantum dots (quantum dots according to an embodiment of the present invention).

Referring to FIGS. 3(a) to (c), it can be confirmed that the InP/ZnS structure-based quantum dots ($E_{g,InP\ core} < E_{g,ZnS\ shell}$) form a quantum well through quantum confinement in the InP core, so that a lattice mismatch of about 8.6% occurs due to a lattice constant difference between the InP core (5.93 A) and the ZnS shell (5.42 A) and, accordingly, wide half-width characteristics and non-uniform shell epitaxial growth characteristics are exhibited.

It can be confirmed that the InP/ZnSeS/ZnS structure-based quantum dots including a ZnSeS inter shell also exhibit a high lattice mismatch of about 4.6% to 8.6%.

On the other hand, since the quantum dots (InP/ZnSe/ZnSeS/ZnS structure-based quantum dots) according to an embodiment of the present invention include ZnSe (5.66 A)/ZnSe1−xSx (5.66 to 5.42 A, where x is a positive real number) inter shells and the concentrations (and composition ratios) of compounds of the inter shells are changed stepwise from the InP core to the ZnS outer shell, wide half-width characteristics and non-uniform shell epitaxial growth characteristics may be improved.

In particular, since the ZnSe (5.66 A)/$ZnSe_{1-x}S_x$ inter shells may be band-aligned by an energy that is larger than the InP core energy band-gap (1.35 eV) and smaller than the ZnS shell energy band-gap (3.6 eV), lattice mismatch may be decreased (4.6%). Accordingly, wide half-width characteristics and non-uniform shell epitaxial growth characteristics may be improved.

Figure 4:
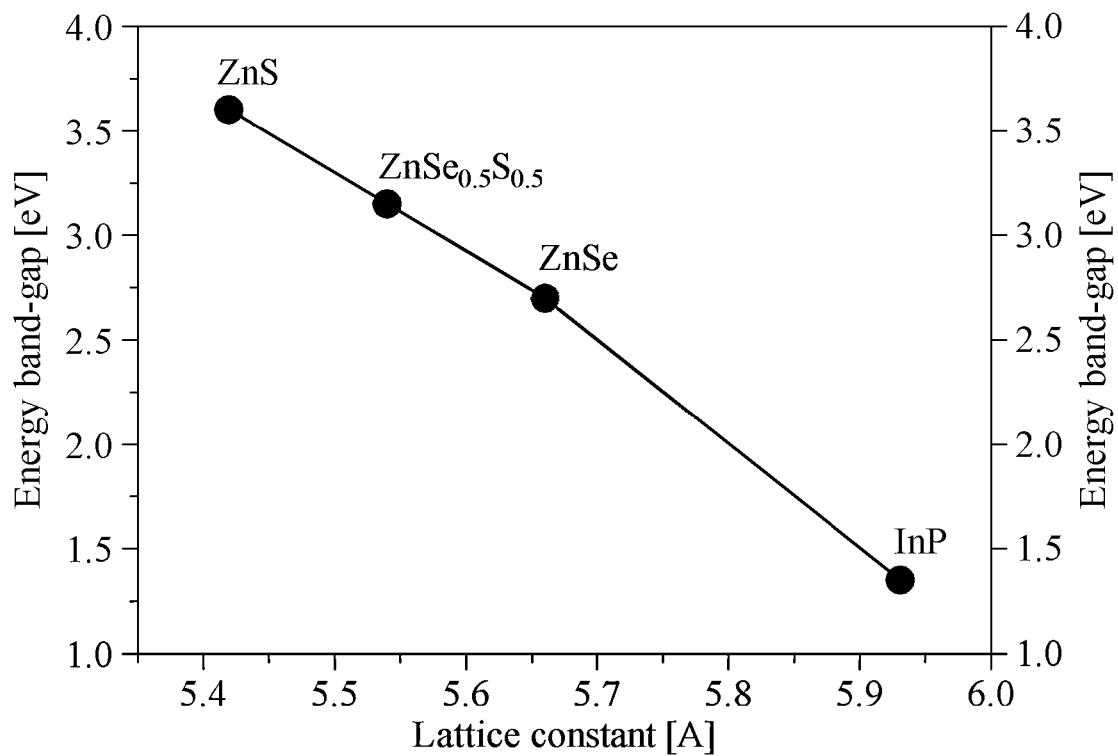
FIG. 4 illustrates energy band-gap characteristics of quantum dots according to an embodiment of the present invention.
Figure 5A:
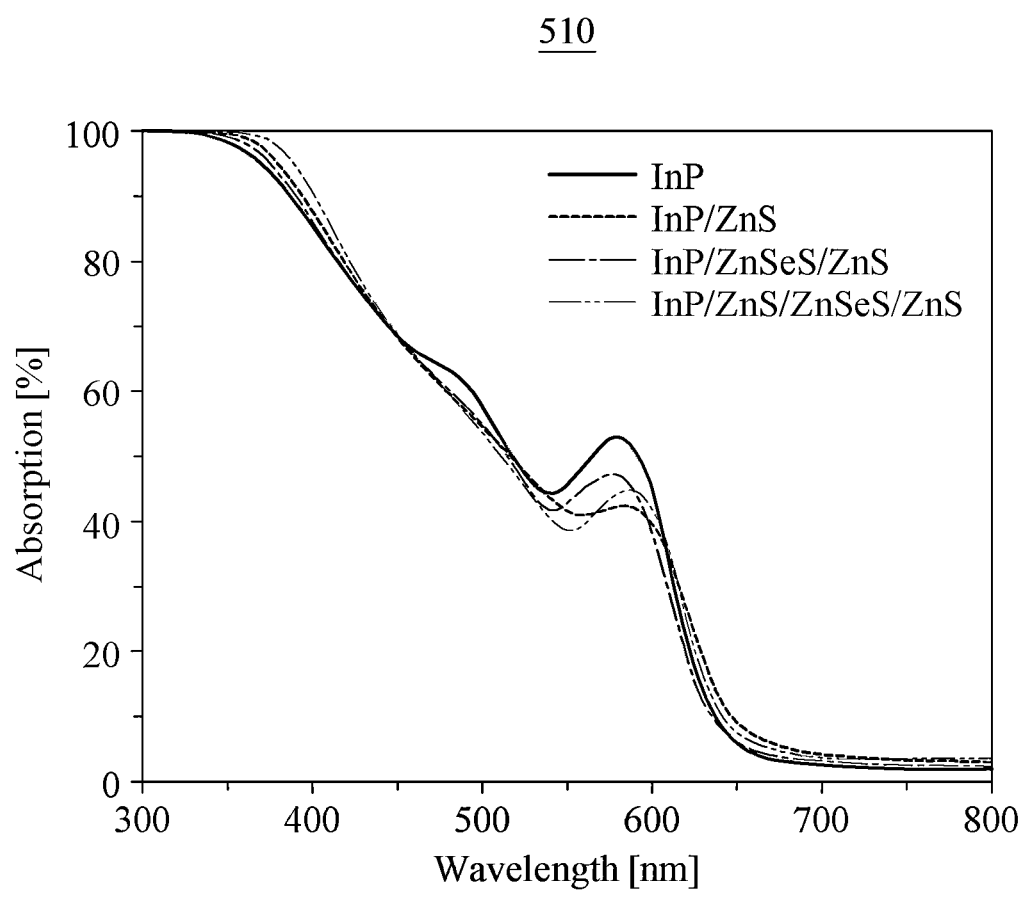
FIGS. 5A to 5E illustrate optical characteristics of red-emitting quantum dots according to an embodiment of the present invention.
Figure 5B:
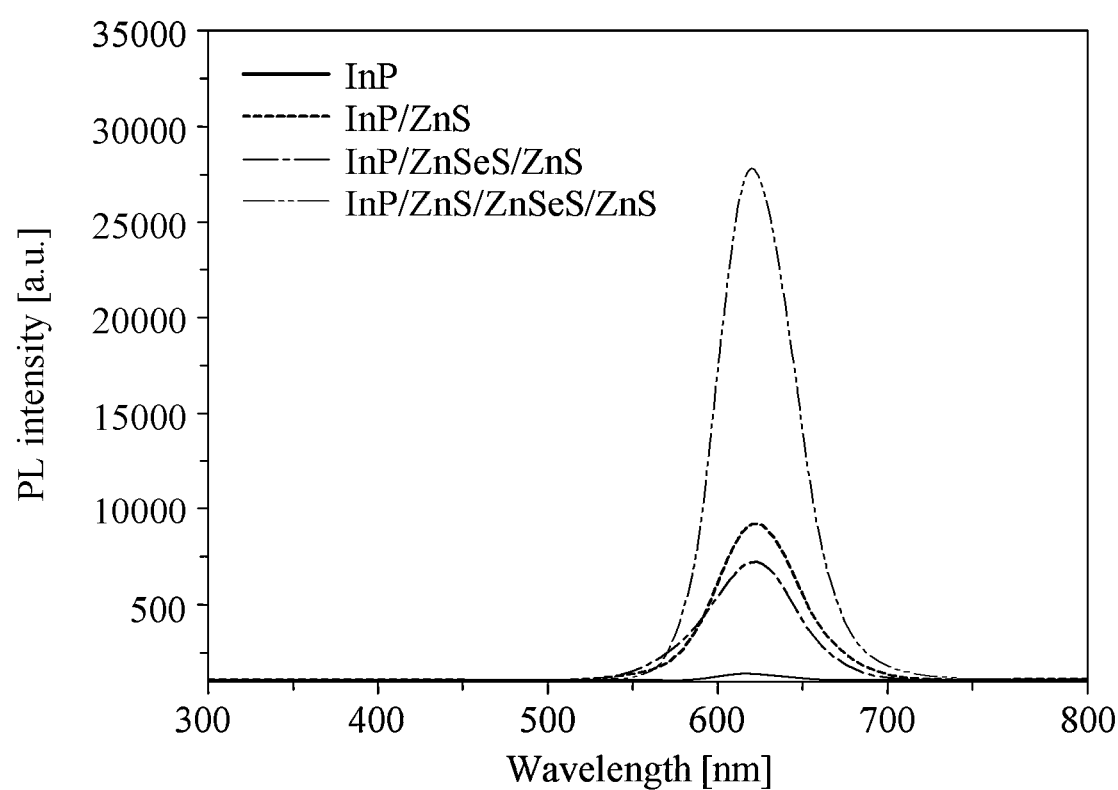
Figure 5C:
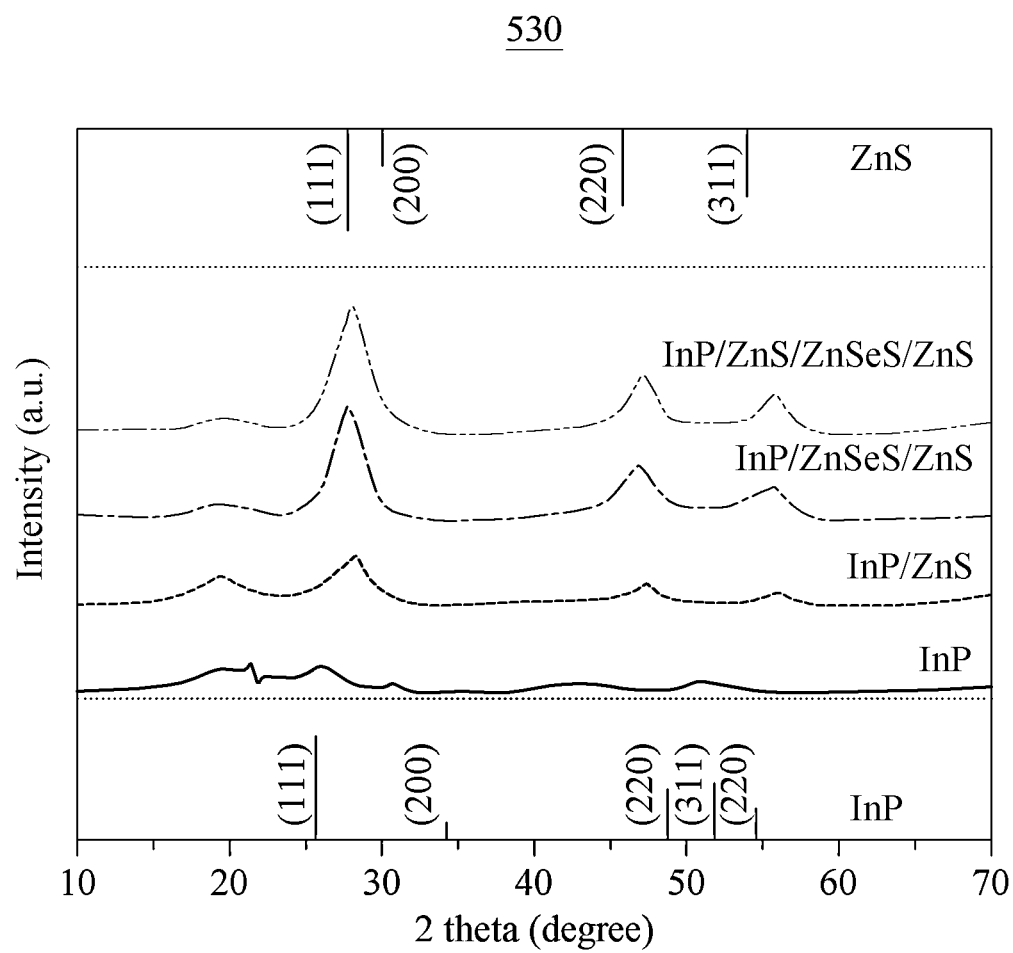
Figure 5D:
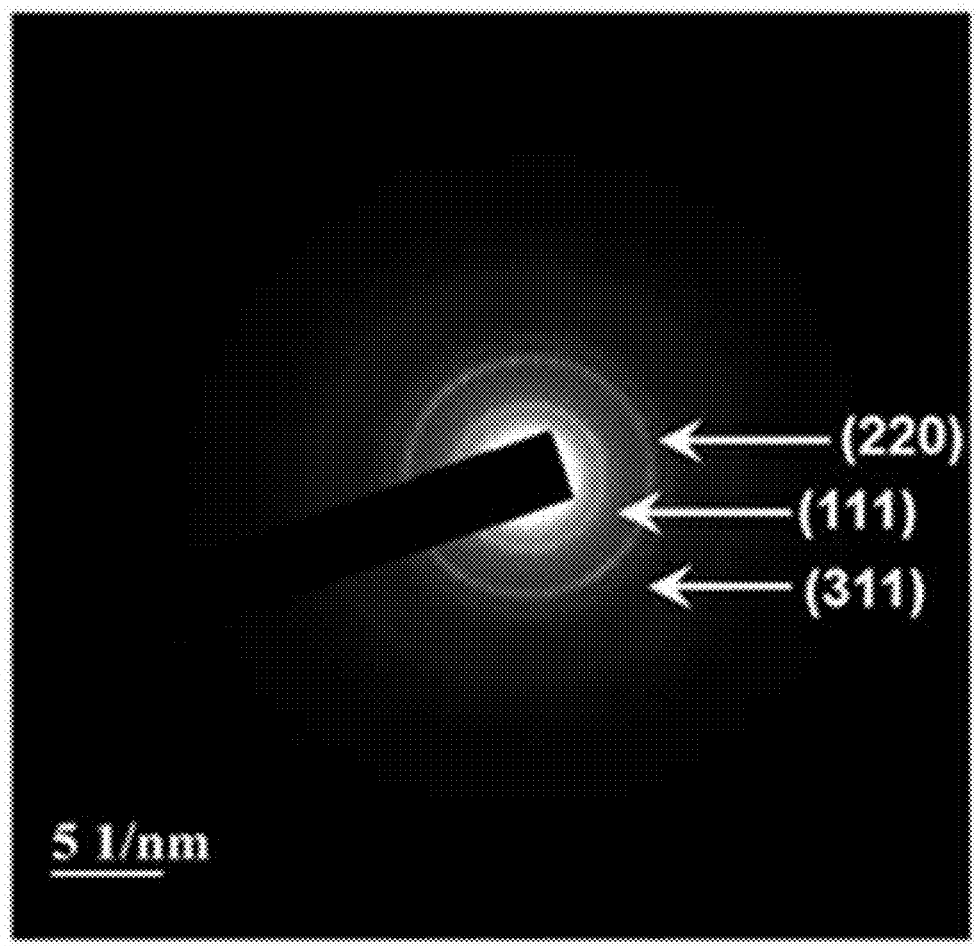
Figure 5E:
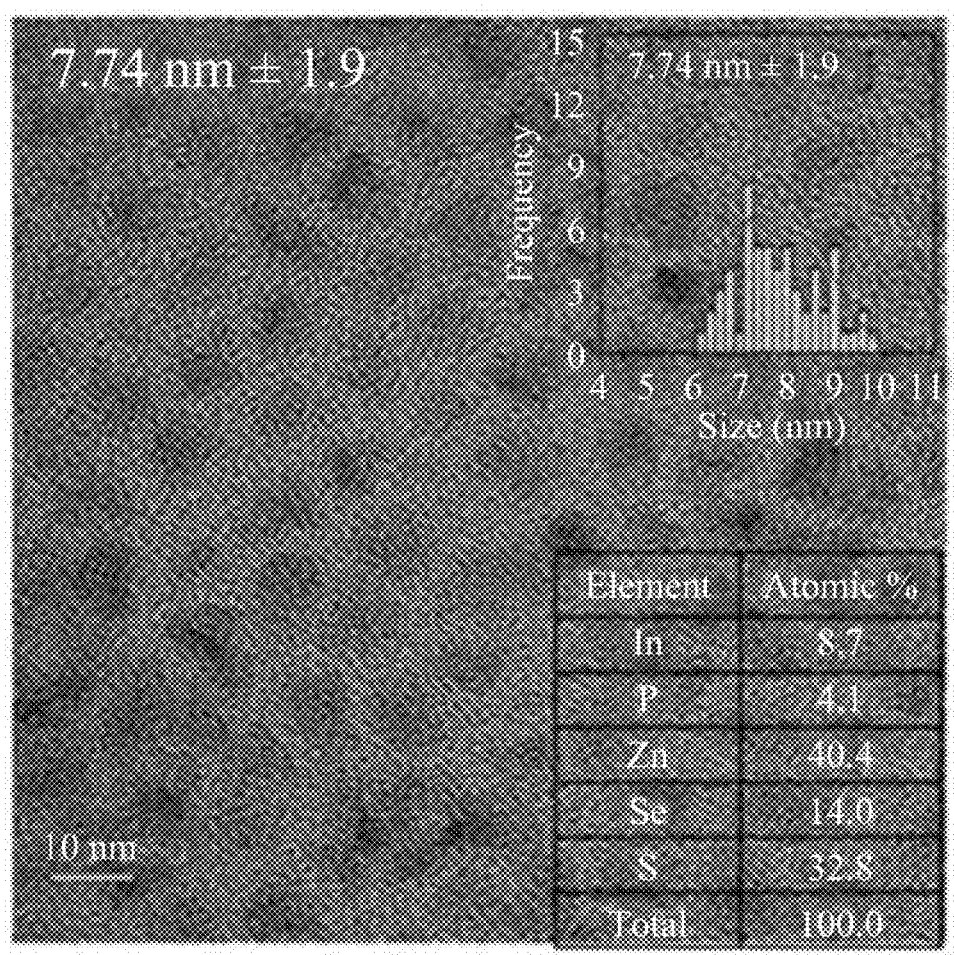
Figure 6A:
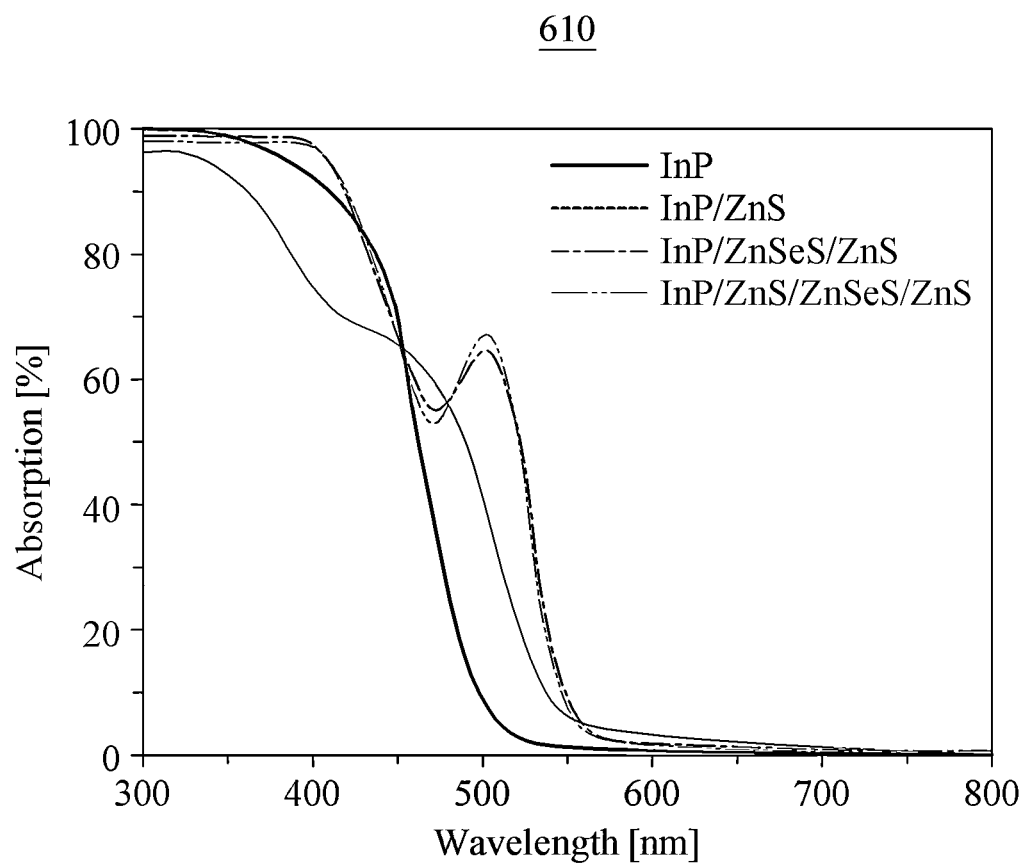
FIGS. 6A to 6E illustrate optical characteristics of green-emitting quantum dots according to an embodiment of the present invention.
Figure 6B:
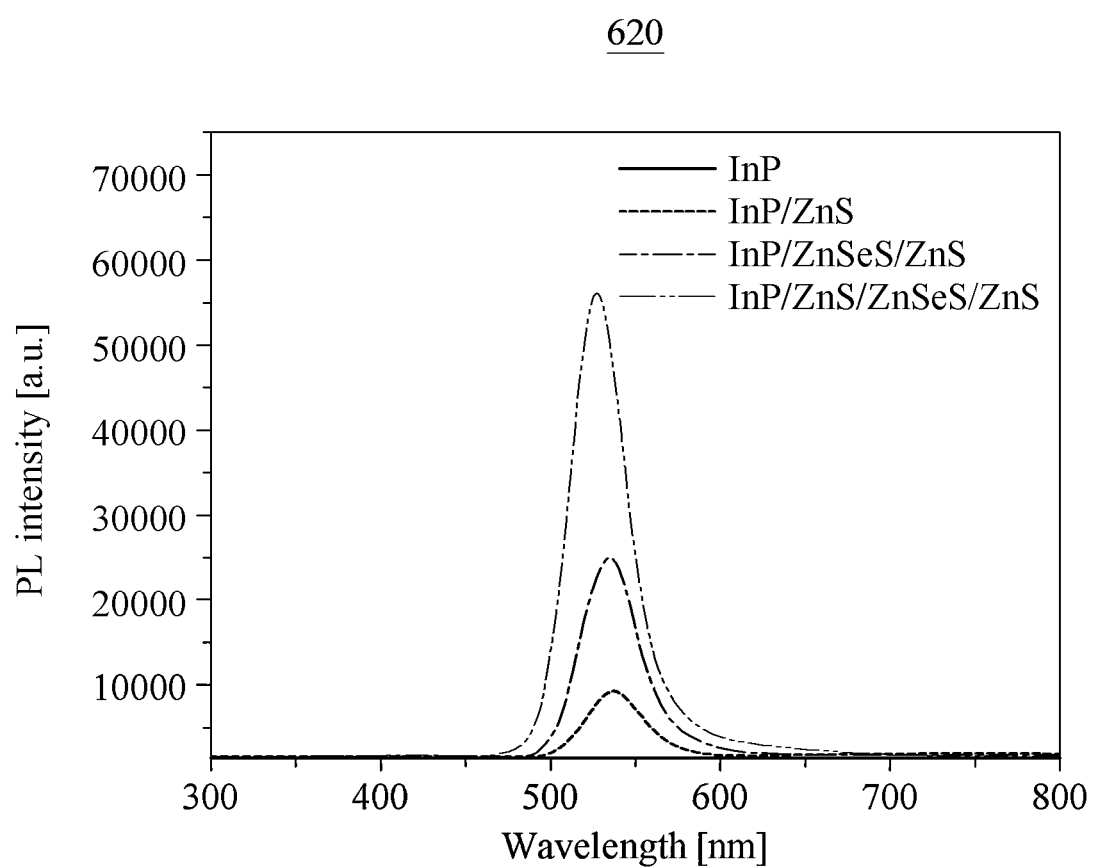
Figure 6C:
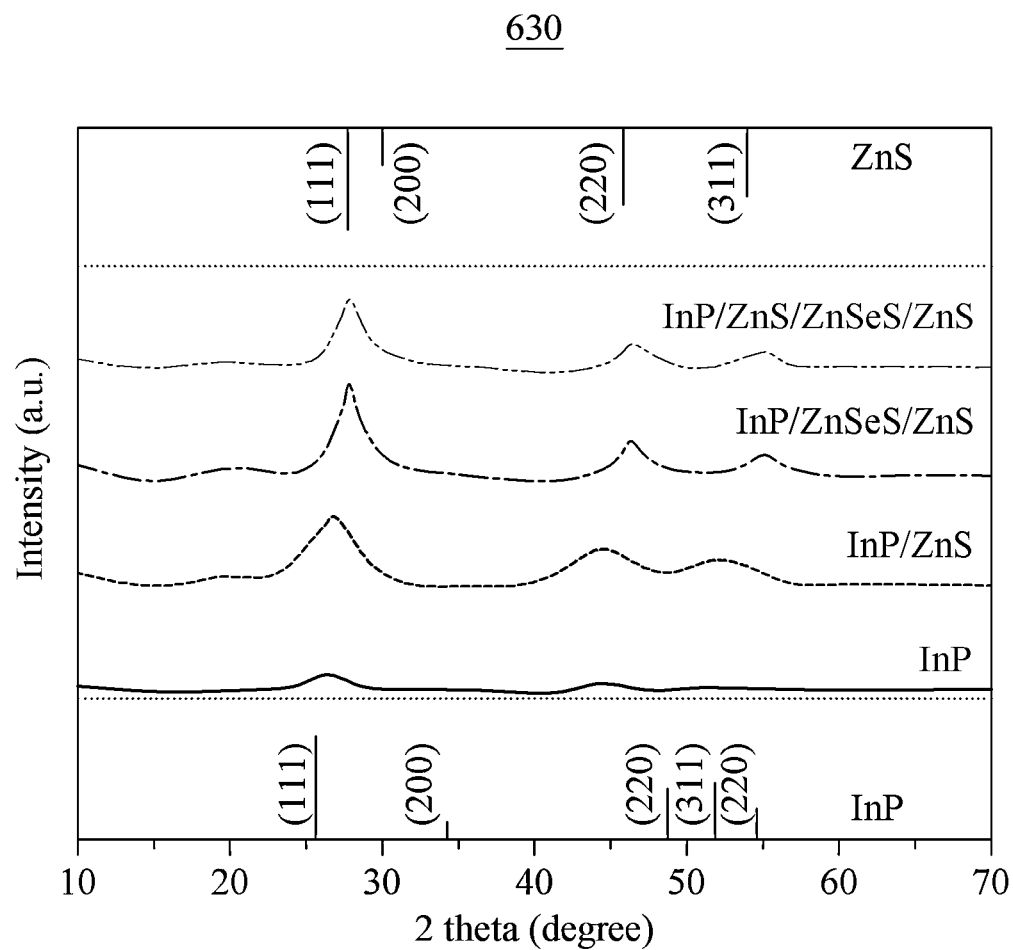
Figure 6D:
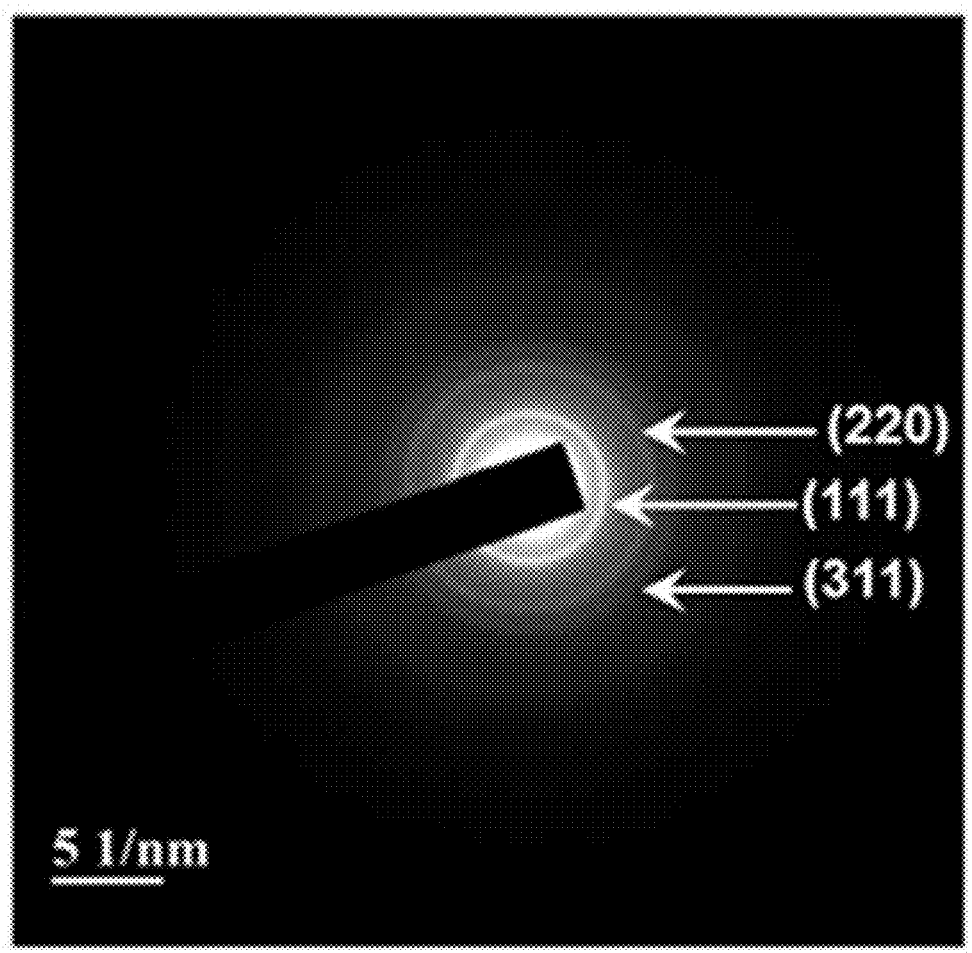
Figure 6E:
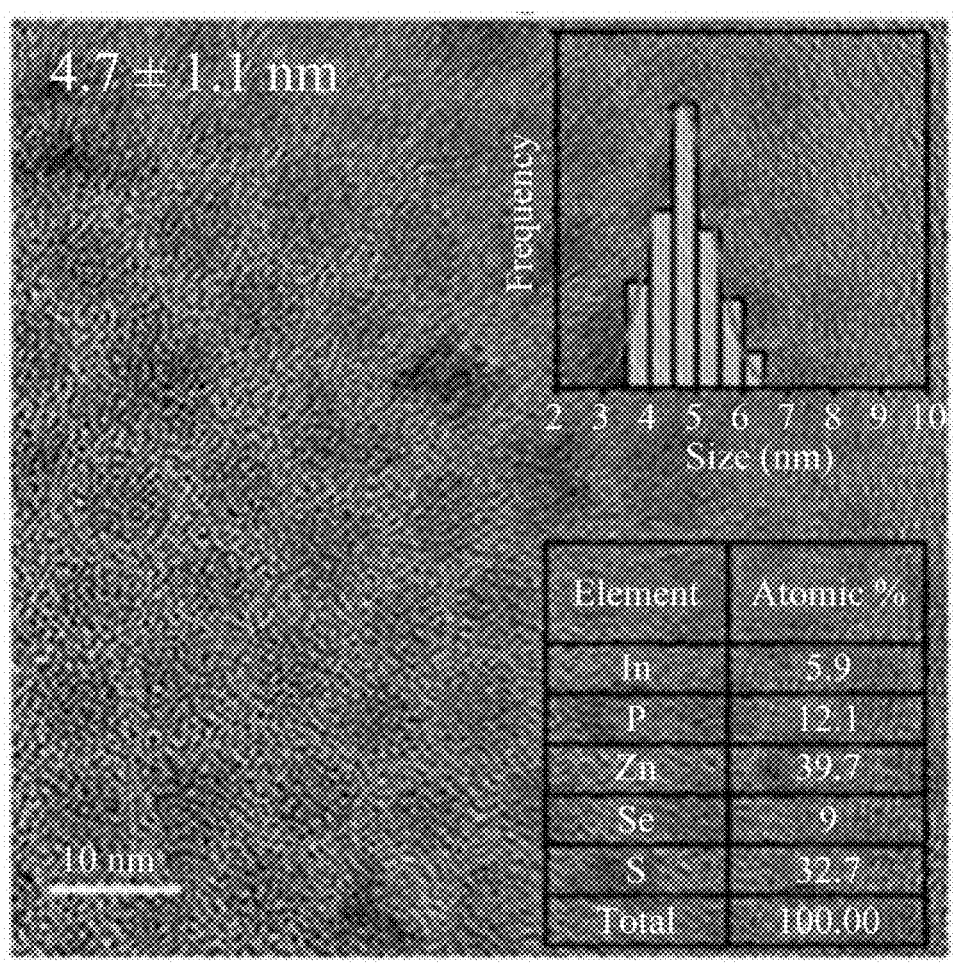

FIG. 4 illustrates energy band-gap characteristics of quantum dots according to an embodiment of the present invention.

Referring to FIG. 4, lattice constant-dependent energy band-gap characteristics of the quantum dots according to an embodiment of the present invention are summarized in Table 1 below.

TABLE 1

| Material | Crystal structure | Lattice constant (Å) | Energy band-gap (eV, $E_g$) |
|---|---|---|---|
| InP core | Zinc blend | 5.93 | 1.35 |
| ZnSe inter shell | Zinc blend | 5.66 | 2.7 |
| $ZnSe_{0.5}S_{0.5}$ inter shell | Zinc blend | 5.54 | 3.15 |
| ZnS outer shell | Zinc blend | 5.42 | 3.6 |

As shown in FIG. 4 and Table 1, the conventional quantum dots (InP/ZnS structure-based quantum dots) exhibit lattice constant mismatch due to a lattice constant difference between the InP core and the ZnS outer-shell, but the quantum dots (InP/ZnSe/ZnSeS/ZnS structure-based quantum dots) according to an embodiment of the present invention exhibit minimized lattice constant mismatch due to the ZnSe/ZnSeS inter shells inserted between the InP core and the ZnS outer-shell.

For example, the first inter shell (ZnSe layer) of the ZnSe/ZnSeS inter shells may be formed to have three layers, and the second inter shell (ZnSeS layer) thereof may be formed to have two layers. Here, the respective layers may be subjected to bandgap engineering to minimize lattice constant mismatch with the adjacent InP core or ZnS outer-shell.

FIGS. 5A to 5E illustrate optical characteristics of red-emitting quantum dots according to an embodiment of the present invention.

Referring to FIGS. 5A to 5E, reference numeral 510 illustrates wavelength change-dependent absorption of the red-emitting quantum dots (InP/ZnSe/ZnSeS/ZnS) according to an embodiment of the present invention, and reference numeral 520 illustrates wavelength change-dependent PL intensity of the red-emitting quantum dots according to an embodiment of the present invention.

Reference numerals 530 to 550 respectively illustrate X ray diffraction (XRD) analysis results of the red-emitting quantum dots according to an embodiment of the present invention, a selected-area electron diffraction (SAED) image thereof and a transmission electron microscope (TEM) image thereof.

For example, the InP core of the red-emitting quantum dot according to an embodiment of the present invention may be formed to have an $In_mP_n/In_oP_p$ multilayer, the first inter shell thereof may be formed to have a $Zn_aSe_b/Zn_cSe_d/Zn_eSe_f$ multilayer, and the second inter shell thereof may be formed to have a $Zn_gSe_hS_i/Zn_jSe_kS_l$ multilayer.

From reference numeral 510 to 550, it can be confirmed that the red-emitting quantum dots according to an embodiment of the present invention exhibit high crystallinity (crystals 111, 220, and 311) and are formed to have a size of about 7.74±1.9 nm.

In addition, optical characteristics of the red-emitting quantum dots (RQD) according to an embodiment of the present invention are summarized in Table 2 below.

TABLE 2

| RQD | Core | First inter shell | Second inter shell | Outer shell | Wavelength ($\lambda$) | Quantum yield (QY) | Half-width (FWHM) |
|---|---|---|---|---|---|---|---|
| InP | $In_mP_n/In_oP_p$ | — | — | — | 598 nm | 2% | 49 nm |
| InP/ZnS | | — | — | ZnS | 607 nm | 41% | 64 nm |
| InP/ZnSeS/ZnS | | — | $Zn_gSe_hS_i/$ | | 610 nm | 63% | 53 nm |
| InP/ZnSe/ZnSeS/ZnS | | $Zn_aSe_b/Zn_cSe_d/$ $Zn_eSe_f$ | $Zn_jSe_kS_l$ | | 615 nm | 85~90% | 39 nm |

From Table 2, it can be confirmed that the red-emitting quantum dots according to an embodiment of the present invention exhibit a quantum yield increased by about 45% and a half-width decreased by about 25 nm (improved optical characteristics), compared to the conventional InP/ZnS structure-based red-emitting quantum dots.

FIGS. 6A to 6E illustrate optical characteristics of green-emitting quantum dots according to an embodiment of the present invention.

Referring to FIGS. 6A to 6E, reference numeral 610 illustrates wavelength change-dependent absorption of the green-emitting quantum dots (InP/ZnSe/ZnSeS/ZnS) according to an embodiment of the present invention, and reference numeral 620 illustrates wavelength change-dependent PL intensity of the green-emitting quantum dots according to an embodiment of the present invention.

Reference numerals 630 to 650 respectively illustrate X ray diffraction (XRD) analysis results of the green-emitting quantum dots according to an embodiment of the present invention, a selected area electron diffraction (SAED) image thereof, and a transmission electron microscope (TEM) image thereof.

For example, the first inter shell of the green-emitting quantum dots according to an embodiment of the present invention may be formed to have a $Zn_aSe_b/Zn_cSe_d/Zn_eSe_f$ multilayer and the second inter shell thereof may be formed to have a $Zn_gSe_hS_i/Zn_jSe_kS_l$ multilayer.

From reference numerals 610 to 650, it can be confirmed that the green-emitting quantum dots according to an embodiment of the present invention exhibit high crystallinity (crystals 111, 220, and 311) and are formed to have a size of about 4.7±1.1 nm.

In addition, optical characteristics of the green-emitting quantum dots (GQD) according to an embodiment of the present invention are summarized in Table 3 below.

Figure 7:
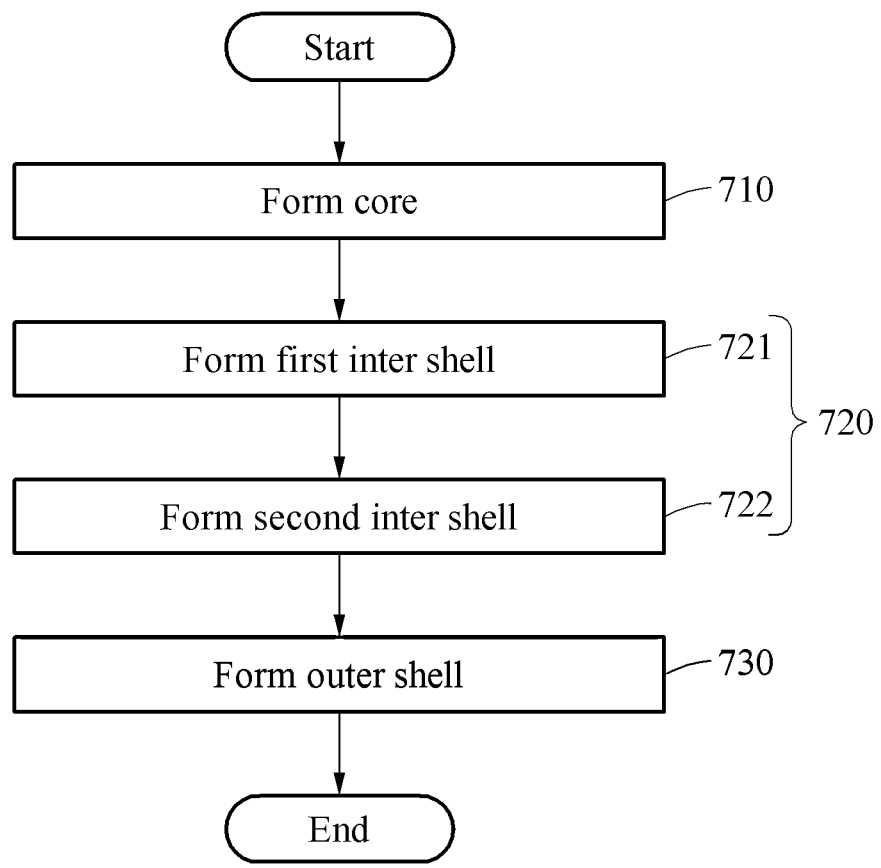
FIG. 7 illustrates a method of manufacturing quantum dots according to an embodiment of the present invention.

In other words, FIG. 7 illustrates a method of manufacturing the quantum dots according to an embodiment of the present invention described with reference to FIGS. 1 to 6. Hereinafter, parts, which have been described with reference to FIGS. 1 to 7, of contents described with reference to FIG. 7 are omitted.

Referring to FIG. 7, in step 710 of the method of manufacturing the quantum dots according to an embodiment of the present invention, cores are formed.

Preferably, the cores formed in step 710 of the method of manufacturing the quantum dots according to an embodiment of the present invention may include an InP compound.

In addition, in step 710 of the method of manufacturing the quantum dots according to an embodiment of the present invention, inter cores may be formed, and an outer core surrounding each of the formed inter cores may be formed.

For example, the inter cores may include an $In_mP_n$ compound, and the outer cores may include an $In_oP_p$ compound, where m is 0.30 to 0.04, n is 0.25 to 0.35, o is 0.15 to 0.20, p is 0.125 to 0.175, and m to p satisfy m>o and n>p.

More particularly, in step 710 of the method of manufacturing the quantum dots according to an embodiment of the present invention, 0.3 mmol of indium acetate, 10 mL of 1-octadecane (ODE) and 0.9 mmol of palmitic acid (PA) may be fed into a 3-neck flask, followed by heating to 150° C. under vacuum. After one hour, the atmosphere in the reactor may be converted to nitrogen ($N_2$).

Next, in step 710 of the method of manufacturing the quantum dots according to an embodiment of the present invention, 0.15 mmol of a tris(trimethylsilyl)phosphine (TMS3P) solution may be rapidly injected after heating to 320° C. and reaction may be allowed to proceed, thereby forming inter cores.

Next, in step 710 of the method of manufacturing the quantum dots according to an embodiment of the present invention, an outer-core mixture solution including 0.2 mmol of indium acetate, 5 mL of 1-octadecene (ODE), 0.6 mmol of palmitic acid (PA) and 0.1 mmol of tris(trimethylsilyl)phosphine (TMS3P) may be slowly fed dropwise into a separate inter-core reactor to form outer cores.

In step 720 of the method of manufacturing the quantum dots according to an embodiment of the present invention, inter shells surrounding the cores may be formed.

TABLE 3

| GQD | Core | First inter shell | Second inter shell | Outer shell | Wavelength ($\lambda$) | Quantum yield (QY) | Half-width (FWHM) |
|---|---|---|---|---|---|---|---|
| InP | InP | — | — | — | — | — | — |
| InP/ZnS | | — | — | ZnS | 530 nm | 48% | 54 nm |
| InP/ZnSeS/ZnS | | — | $Zn_gSe_hS_i/$ | | 533 nm | 65% | 46 nm |
| InP/ZnSe/ZnSeS/ZnS | | $Zn_aSe_b/Zn_cSe_d/$ $Zn_eSe_f$ | $Zn_jSe_kS_l$ | | 535 nm | 85~90% | 40 nm |

From Table 3, it can be confirmed that the green-emitting quantum dots according to an embodiment of the present invention exhibit a quantum yield increased by about 42% and a half-width decreased by about 14 nm (improved optical characteristics), compared to the conventional InP/ZnS structure-based green-emitting quantum dots.

FIG. 7 illustrates a method of manufacturing quantum dots according to an embodiment of the present invention.

In particular, in step 721 and 722 of the method of manufacturing the quantum dots according to an embodiment of the present invention, the first and second inter shells having multiple layers may be formed. Preferably, the first inter shells may include a ZnSe compound, and the second inter shells may include a ZnSeS compound.

More particularly, in step 720 of the method of manufacturing the quantum dots according to an embodiment of the present invention, 3 mmol of zinc stearate may be rapidly added to 10 mL of a 1-octadecene mixture solution, followed by allowing reaction to proceed at 330° C. for 30 minutes.

Next, in step 720 of the method of manufacturing the quantum dots according to an embodiment of the present invention, 0.5 ml of 1.6 M Se-TOP may be added and allowed to react at 330° C. for 30 minutes, and 0.06 ml of 1.6 M Se-TOP and 2 ml of 2 M S-TOP may be continuously added and allowed to react for 120 minutes, thereby forming the first inter shells (ZnS) and the second inter shells (ZnSeS).

Next, in step 720 of the method of manufacturing the quantum dots according to an embodiment of the present invention, the quantum dot solution may be rapidly cooled to room temperature after terminating the reaction and ethanol may be added thereto to form a precipitate. The precipitate may be separated by centrifugation and redispersed in hexane or toluene.

Meanwhile, the concentrations of the compounds composing the inter shells formed in step 720 of the method of manufacturing the quantum dots according to an embodiment of the present invention may be changed stepwise toward the outer shell from the core.

In particular, the method of manufacturing the quantum dots according to an embodiment of the present invention requires a high-temperature growth process for high crystallinity of the first and second inter shells after core growth, and uniform shell growth. However, such a high-temperature growth process may cause high thermal expansion coefficient (TEC) mismatch between the core and the inter shells and between the first inter shell and the second inter shell, thereby causing crystal defects at interfaces.

Accordingly, in step 720 of the method of manufacturing the quantum dots according to an embodiment of the present invention, a graded heating-up growth process may be applied to change a growth temperature stepwise, thereby being capable of minimizing TEC mismatch and allowing growth of the inter shells. Accordingly, crystal defects may be minimized, thus realizing high optical characteristics.

In addition, in step 720 of the method of manufacturing the quantum dots according to an embodiment of the present invention, the inter shells may grow on the cores by a successive ironic layer adsorption and reaction (SILAR) method.

In particular, when the quantum dots according to an embodiment of the present invention are red-emitting quantum dots, the first inter shells may be formed to surround the cores while increasing a growth temperature stepwise in a temperature range of 120° C. to 330° C., and the second inter shells may be formed to surround the first inter shells while increasing a growth temperature stepwise in a temperature range of 260° C. to 320° C., in step 720 of the method of manufacturing the quantum dots according to an embodiment of the present invention.

For example, the first inter shell may include a first shell layer including a $Zn_aSe_b$ compound, a second shell layer including a $Zn_cSe_d$ compound, and a third shell layer including a $Zn_eSe_f$ compound, where a is 0.3 to 0.6, b is 0.2 to 0.3, c is 0.36 to 0.72, d is 0.16 to 0.24, e is 0.39 to 0.78, f is 0.14 to 0.21, and a to f satisfy a<c<e and b>d>f.

In addition, the second inter shell may include a fourth shell layer including a $Zn_gSe_hS_i$ compound and a fifth shell layer including a $Zn_jSe_kS_l$ compound, where g is 0.1 to 0.5, h is 0.005 to 0.020, i is 0.5 to 2.0, j is 0.1 to 0.5, k is 0.0025 to 0.010, l is 1.0 to 4.0, and g to l satisfy g≤j, h>k and i<l.

More particularly, when the quantum dots according to an embodiment of the present invention are red-emitting quantum dots, the first shell layers surrounding the cores may be formed while increasing a growth temperature stepwise in a temperature range of 120° C. to 210° C. in step 720 of the method of manufacturing the quantum dots according to an embodiment of the present invention.

Next, in step 720 of the method of manufacturing the quantum dots according to an embodiment of the present invention, the second shell layers surrounding the first shell layers may be formed while increasing a growth temperature stepwise in a temperature range of 240° C. to 270° C.

Next, in step 720 of the method of manufacturing the quantum dots according to an embodiment of the present invention, the third shell layers surrounding the second shell layers may be formed while increasing a growth temperature stepwise in a temperature range of 300° C. to 330° C.

Next, in step 720 of the method of manufacturing the quantum dots according to an embodiment of the present invention, the fourth shell layers surrounding the third shell layers may be formed in a temperature range of 260° C. to 300° C.

Next, in step 720 of the method of manufacturing the quantum dots according to an embodiment of the present invention, the fifth shell layers surrounding the fourth shell layers may be formed at a growth temperature of 320° C.

Meanwhile, when the quantum dots according to an embodiment of the present invention are green-emitting quantum dots, the first inter shells surrounding the cores may be formed while increasing a growth temperature stepwise in a temperature range of 200° C. to 300° C. and the second inter shells surrounding the first inter shells may be formed while increasing a growth temperature stepwise in a temperature range of 260° C. to 320° C., in step 720 of the method of manufacturing the quantum dots according to an embodiment of the present invention.

More particularly, when the quantum dots according to an embodiment of the present invention are green-emitting quantum dots, the first shell layers surrounding the cores may be formed while increasing a growth temperature stepwise in a temperature range of 200° C. to 220° C. in step 720 of the method of manufacturing the quantum dots according to an embodiment of the present invention.

Next, in step 720 of the method of manufacturing the quantum dots according to an embodiment of the present invention, the second shell layers surrounding the first shell layers may be formed while increasing a growth temperature stepwise in a temperature range of 240° C. to 260° C.

Next, in step 720 of the method of manufacturing the quantum dots according to an embodiment of the present invention, the third shell layers surrounding the second shell layers may be formed while increasing a growth temperature stepwise in a temperature range of 280° C. to Next, in step 720 of the method of manufacturing the quantum dots according to an embodiment of the present invention, the fourth shell layers surrounding the third shell layers may be formed while increasing a growth temperature stepwise in a temperature range of 260° C. to 300° C.

Next, in step 720 of the method of manufacturing the quantum dots according to an embodiment of the present invention, the fifth shell layers surrounding the fourth shell layers may be formed at a growth temperature of 320° C.

Graded heating-up growth processes used when the quantum dots according to an embodiment of the present invention are red-emitting quantum dots or green-emitting quantum dots are more particularly described below with reference to FIGS. 8 to 9.

In step 730 of the method of manufacturing the quantum dots according to an embodiment of the present invention, the outer shell surrounding the inter shells may be formed. Preferably, the outer shells may include a ZnS compound.

Figure 8:
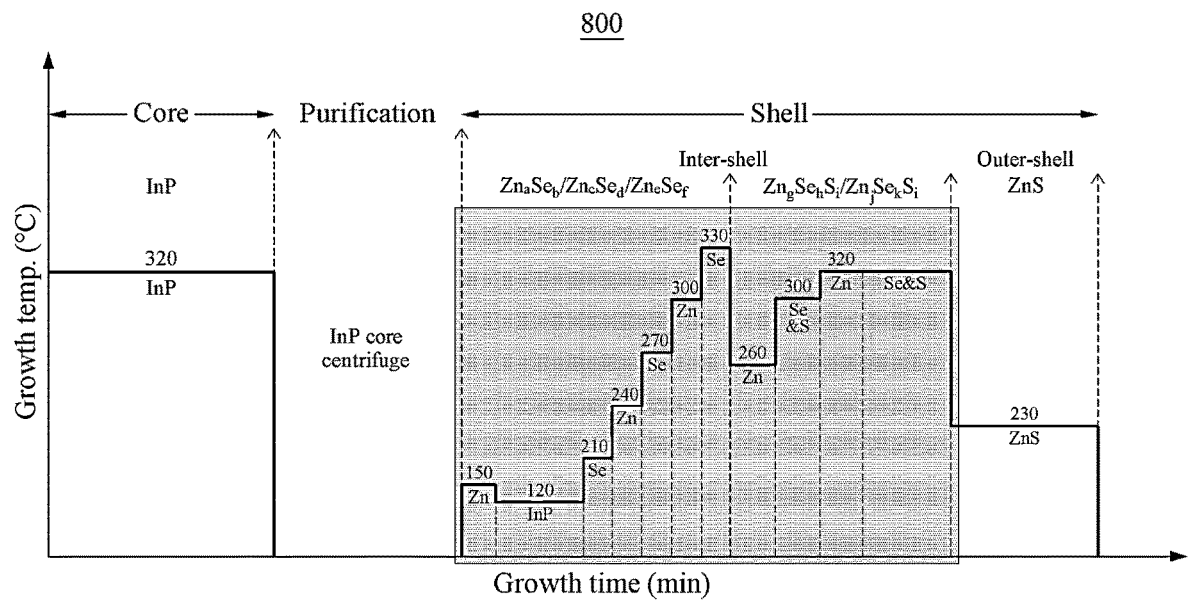
FIG. 8 illustrates an embodiment of a method of manufacturing red-emitting quantum dots according to an embodiment of the present invention.

FIG. 8 illustrates an embodiment of a method of manufacturing red-emitting quantum dots according to an embodiment of the present invention.

Referring to FIG. 8, reference numeral 800 illustrates a method of manufacturing quantum dots using a graded heating-up growth process when the quantum dots according to an embodiment of the present invention are red-emitting quantum dots.

Referring to reference numeral 800, the quantum dots manufactured according to the method according to an embodiment of the present invention may include an InP core, a first inter shell having a $Zn_aSe_b/Zn_bSe_c/Zn_eSe_f$ multilayer, a second inter shell having a $Zn_gSe_hS_i/Zn_jSe_kS_l$ multilayer, and a ZnS outer-shell.

In addition, the $Zn_aSe_b$, $Zn_bSe_c$ and $Zn_eSe_f$ layers of the first inter shell may be respectively first to third shell layers, and the $Zn_gSe_hS_i$ and $Zn_jSe_kS_l$ layers of the second inter shell may be respectively fourth to fifth shell layers.

In particular, in the method of manufacturing the quantum dots according to an embodiment of the present invention, the InP cores may be formed at a growth temperature of 320° C.

For example, in the method of manufacturing the quantum dots according to an embodiment of the present invention, the formed InP cores may be subjected to a purification process.

That is, in the method of manufacturing the quantum dots according to an embodiment of the present invention, the formed InP core may be subjected to a purification process using a centrifuge to remove side products produced in the core formation process.

Next, in the method of manufacturing the quantum dots according to an embodiment of the present invention, a Zn precursor may be injected at a growth temperature of 150° C. and a Se precursor may be injected at a growth temperature of 210° C. to form the first shell layers, and an InP compound may be injected at a growth temperature of 120° C. before injecting the Se precursor in the first shell layer formation process.

That is, since an InP compound is dispersed in an organic solvent, the InP compound may be injected at a temperature (120° C.) above a boiling point (110° C.) of an organic solvent to evaporate the organic solvent according to the method of manufacturing the quantum dots according to an embodiment of the present invention.

Next, in the method of manufacturing the quantum dots according to an embodiment of the present invention, a Zn precursor may be injected at a growth temperature of 240° C. and a Se precursor may be injected at a growth temperature of 270° C. to form the second shell layer.

Next, in the method of manufacturing the quantum dots according to an embodiment of the present invention, a Zn precursor may be injected at a growth temperature of 300° C. and a Se precursor may be injected at a growth temperature of 330° C. to form the third shell layer.

Next, in the method of manufacturing the quantum dots according to an embodiment of the present invention, a Zn precursor may be injected at a growth temperature of 260° C., and Se and S precursors may be injected at a growth temperature of 300° C. to form the fourth shell layer.

Next, in the method of manufacturing the quantum dots according to an embodiment of the present invention, Zn, Se and S precursors may be injected at a growth temperature of 320° C. to form the fifth shell layer.

Meanwhile, in the method of manufacturing the quantum dots according to an embodiment of the present invention, a ZnS outer-shell may be formed at a growth temperature of 230° C. after forming the inter shell (the first to fifth shell layers).

Figure 9:
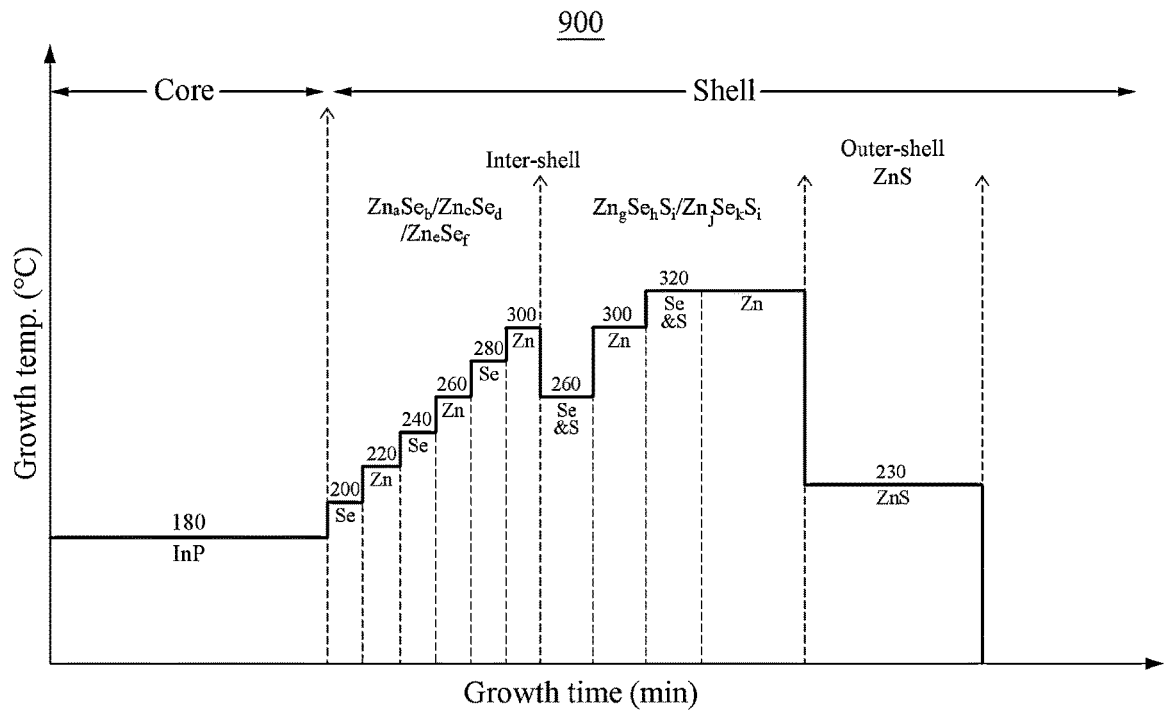
FIG. 9 illustrates an embodiment of a method of manufacturing green-emitting quantum dots according to an embodiment of the present invention.

FIG. 9 illustrates an embodiment of a method of manufacturing green-emitting quantum dots according to an embodiment of the present invention.

Referring to FIG. 9, reference numeral 900 illustrates a method of manufacturing quantum dots using a graded heating-up growth process when the quantum dots according to an embodiment of the present invention are green-emitting quantum dots.

According to reference numeral 900, each of the quantum dots manufactured according to the method according to an embodiment of the present invention may include an InP core, a first inter shell having a $Zn_aSe_b/Zn_bSe_c/Zn_eSe_f$ multilayer, a second inter shell having a $Zn_gSe_hS_i/Zn_jSe_kS_l$ multilayer, and a ZnS outer-shell.

In addition, the $Zn_aSe_b$, $Zn_bSe_c$ and $Zn_eSe_f$ layers of the first inter shell may be respectively first to third shell layers, and the $Zn_gSe_hS_i$ and $Zn_jSe_kS_l$ layers of the second inter shell may be respectively fourth to fifth shell layers.

In particular, in the method of manufacturing the quantum dots according to an embodiment of the present invention, the InP core may be formed at a growth temperature of 180° C.

Next, in the method of manufacturing the quantum dots according to an embodiment of the present invention, a Se precursor may be injected at a growth temperature of 200° C. and a Zn precursor may be injected at a growth temperature of 220° C. to form the first shell layer.

Next, in the method of manufacturing the quantum dots according to an embodiment of the present invention, a Se precursor may be injected at a growth temperature of 240° C. and a Ze precursor may be injected at a growth temperature of 260° C. to form the second shell layer.

Next, in the method of manufacturing the quantum dots according to an embodiment of the present invention, a Se precursor may be injected at a growth temperature of 280° C. and a Zn precursor may be injected at a growth temperature of 300° C. to form the third shell layer.

Next, in the method of manufacturing the quantum dots according to an embodiment of the present invention, Se and S precursors may be injected at a growth temperature of 260° C., and a Zn precursor may be injected at a growth temperature of 300° C. to form the fourth shell layer.

Next, in the method of manufacturing the quantum dots according to an embodiment of the present invention, Zn, Se and S precursors may be injected at a growth temperature of 320° C. to form the fifth shell layer.

Meanwhile, in the method of manufacturing the quantum dots according to an embodiment of the present invention, a ZnS outer-shell may be formed at a growth temperature of 230° C. after forming the inter shell (the first to fifth shell layers).

In conclusion, graded structure-based inter shells are formed between a core and an outer shell according to the present invention, thereby being capable of minimizing lattice mismatch and maximizing quantum confinement.

In addition, the inter shells are formed through a graded heating-up growth process, thereby being capable of minimizing thermal expansion coefficient (TEC) mismatch and, accordingly, improving optical characteristics.

Although the present invention has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

The invention claimed is:

1. A quantum dot, comprising a core; inter shells surrounding the core; and an outer shell surrounding the inter shells,
   wherein concentrations of compounds composing the inter shells are changed stepwise from the core to the outer shell,
   wherein the inter shells comprise a first inter shell having a multilayer structure and a second inter shell having a multilayer structure.

2. The quantum dot according to claim 1, wherein composition ratios of compounds composing the inter shells are changed stepwise from the core to the outer shell.

3. The quantum dot according to claim 1, wherein a concentration of a group II element of the first inter shell increases and a concentration of a first group VI element of the first inter shell is decreased, from the core to the outer shell, and
   a concentration of a first group VI element of the second inter shell is decreased and a concentration of a second group VI element of the second inter shell increase, from the core to the outer shell.

4. The quantum dot according to claim 3, wherein the first inter shell comprises a $Zn_aSe_bSe_d/Zn_eSe_f$ multilayer, where a is 0.3 to 0.6, b is 0.2 to 0.3, c is 0.36 to 0.72, d is 0.16 to 0.24, e is 0.39 to 0.78, f is 0.14 to 0.21, and a to f satisfy a<c<e and b>d>f.

5. The quantum dot according to claim 3, wherein the second inter shell comprises a $Zn_gSe_hS_i/Zn_jSe_kS_l$ multilayer, where g is 0.1 to 0.5, h is 0.005 to 0.020, I is 0.5 to 2.0, j is 0.1 to 0.5, k is 0.0025 to 0.010, l is 1.0 to 4.0, and g to l satisfy g≤j, h>k and i<l.

6. The quantum dot according to claim 1, wherein the inter shells comprises at least one of group compounds, group III-III-II-VI compounds and combinations thereof.

7. The quantum dot according to claim 1, wherein the core comprises at least one of group III-V compounds, group II-VI compounds, group II-III-VI compounds, group III-III-II-VI compounds and combinations thereof, and the outer shell comprises group II-VI compounds.

8. A method of manufacturing quantum dots, the method comprising:
   forming a core;
   forming inter shells surrounding the core, and
   forming an outer shell surrounding the inter shells,
   wherein a concentration of compounds composing the inter shells is changed stepwise from the core to the outer shell,
   wherein the inter shells comprise a first inter shell having a multilayer structure and a second inter shell having a multilayer structure.

9. The method according to claim 8, wherein the forming of the inter shells further comprises:
   forming the first inter shell surrounding the core while increasing a growth temperature stepwise in a temperature range of 120° C. to 330° C.; and
   forming the second inter shell surrounding the first inter shell while increasing a growth temperature stepwise in a temperature range of 260° C. to 320° C.

10. The method according to claim 9, wherein the forming of the first inter shell further comprises:
    forming a first shell layer surrounding the core while increasing a growth temperature stepwise in a temperature range of 120° C. to 210° C.;
    forming a second shell layer surrounding the first shell layer while increasing a growth temperature stepwise in a temperature range of 240° C. to 270° C., and
    forming a third shell layer surrounding the second shell layer while increasing a growth temperature stepwise in a temperature range of 300° C. to 330° C.

11. The quantum dot according to claim 10, wherein the first shell layer comprises a $Zn_aSe_b$ compound, the second shell layer comprises a $Zn_cSe_d$ compound, and the third shell layer comprises a $Zn_eSe_f$ compound,
    where a is 0.3 to 0.6, b is 0.2 to 0.3, c is 0.36 to 0.72, d is 0.16 to 0.24, e is 0.39 to 0.78, f is 0.14 to 0.21, and a to f satisfy a<c<e and b>d>f.

12. The method according to claim 9, wherein the forming of the second inter shell further comprises:
    forming a fourth shell layer surrounding the first inter shell while increasing a growth temperature stepwise in a temperature range of 260° C. to 300° C., and
    forming a fifth shell layer surrounding the fourth shell layer at a growth temperature of 320° C.

13. The quantum dot according to claim 12, wherein the fourth shell layer comprises a $Zn_gSe_hS_i$ compound and the fifth shell layer comprises a $Zn_kSe_jS_l$ compound, where g is 0.1 to 0.5, his h is 0.005 to 0.020, I is 0.5 to 2.0, j is 0.1 to 0.5, k is 0.0025 to 0.010, l is 1.0 to 4.0, and g to l satisfy g≤j, h>k and i<l.

* * * * *